Patented Nov. 21, 1922.

1,436,377

UNITED STATES PATENT OFFICE.

HYYM E. BUC, OF ROSELLE, NEW JERSEY, ASSIGNOR, BY MESNE ASSIGNMENTS, TO STANDARD DEVELOPMENT COMPANY, OF NEW YORK, N. Y., A CORPORATION OF DELAWARE.

ART OF PRODUCING ISOPROPYL CHLORIDE FROM ISOPROPYL ALCOHOL.

No Drawing. Application filed August 13, 1920. Serial No. 403,199.

*To all whom it may concern:*

Be it known that I, HYYM E. BUC, a citizen of the United States, residing at Roselle, in the county of Union and State of New Jersey, have invented a new and useful Improvement in the Art of Producing Isopropyl Chloride from Isopropyl Alcohol, of which the following is a specification.

The present invention relates to the production of iso-propyl chloride from iso-propyl alcohol and will be fully understood from the following description of a process for carrying out the same:

In accordance with the present invention hydrochloric acid is caused to react upon iso-propyl alcohol in the presence or absence of water and preferably at atmospheric pressure under suitably controlled conditions. The reaction is preferably carried out in a still at a temperature such as to produce the desired reaction. If desired, the still may be equipped with a column or dephlegmator, the temperature at the vapor outlet then being preferably approximately the boiling point of the iso-propyl chloride (37° C.), whereby a separation of the iso-propyl chloride is effected.

The concentration of the hydrochloric acid may vary, that preferably used being about 16-20% of the mixture. To a given volume of a concentrated aqueous solution of the acid (about 35% HCl), placed in a still preferably equipped with a dephlegmator as above described, an equal volume of an iso-propyl alcohol-water mixture containing 88% by weight of the alcohol is added. The resulting mixture contains about 16-18% of HCl. The still is then heated, the vapor outlet of the column being preferably maintained at approximately the boiling point of the iso-propyl chloride (37° C.). The reaction starts at a still temperature below 95°, the greater portion of the reaction taking place between 95 and 105° C. The concentration of the HCl may, as previously stated, vary, the reaction taking place with hydrochloric acid below the concentration above stated (say, 10-15% HCl) at a slower rate, and likewise with a higher concentration of HCl. In the latter case HCl gas may pass off with the product under the conditions described. The concentration of iso-propyl alcohol in the mixture may be reduced, it being preferred that the concentration of HCl be about 16-18%.

It is readily apparent that the dephlegmation of the iso-propyl alcohol, water, etc. in the actual process of chloride formation may be omitted, the chloride product being subsequently purified by redistillation.

If desired, the operation may be made practically continuous by replenishing the hydrochloric acid with HCl gas or concentrated hydrochloric acid, either continuously or at intervals, and the iso-propyl alcohol may be similarly replenished. It is likewise apparent that, instead of adding iso-propyl alcohol (or an aqueous solution thereof) to a hydrochloric acid solution to form the reaction mixture, HCl gas may be passed into an aqueous solution of iso-propyl alcohol until a suitable concentration (say 16-18%) of hydrochloric acid is obtained. The mixture is then slowly heated to produce the reaction, and HCl gas may be introduced during reaction to maintain the same concentration.

Although in the specific examples above described, the use of aqueous solutions of the reacting substances has been described, it has also been found that the reaction may, if desired, be carried out under anhydrous conditions at atmospheric pressure. Dry HCl gas may be introduced into anhydrous iso-propyl alcohol and the mixture distilled under atmospheric pressure.

Although the present invention has been described in connection with the details of a specific example thereof, it is not intended that these details shall be regarded as limitations upon the scope of the invention except in so far as included in the accompanying claims.

I claim:

1. The process of preparing iso-propyl chloride which comprises introducing hydrochloric acid into iso-propyl alcohol, distilling the mixture at atmospheric pressure and collecting the evolved isopropyl chloride vapors.

2. The process of preparing iso-propyl chloride which comprises admixing and heating iso-propyl alcohol and hydrochloric acid in the presence of water and removing and collecting the evolved isopropyl chloride vapors.

3. The process of preparing iso-propyl chloride which comprises mixing iso-propyl alcohol and a solution of HCl to produce a mixture of 16–18% HCl concentration and heating the mixture, whereby iso-propyl chloride vapors are evolved.

4. The process of preparing iso-propyl chloride which comprises mixing iso-propyl alcohol and hydrochloric acid in the presence of water, heating the mixture, and returning to the mixture the portion of the evolved vapors condensing below about 37° C. and withdrawing the remaining concentrated iso-propyl chloride vapors.

5. The process of preparing iso-propyl chloride which comprises forming a mixture of water, iso-propyl alcohol and hydrochloric acid, heating the mixture whereby iso-propyl chloride vapors are evolved and replenishing the hydrochloric acid of the mixture.

6. The process of preparing iso-propyl chloride which comprises forming a mixture of water, iso-propyl alcohol and hydrochloric acid, heating the mixture whereby iso-propyl chloride vapors are evolved and replenishing the iso-propyl alcohol of the mixture.

7. The process of preparing iso-propyl chloride which comprises mixing equal volumes of 88% iso-propyl alcohol and hydrochloric acid solution of about 35% concentration and distilling the mixture at atmospheric pressure.

In testimony whereof, I have hereunto set my hand this 7th day of August A. D. 1920.

HYYM E. BUC.